United States Patent
Wu

(10) Patent No.: US 9,794,800 B2
(45) Date of Patent: Oct. 17, 2017

(54) DEVICE AND METHOD OF HANDLING DEACTIVATING TIMER FOR SECONDARY CELL

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/275,484

(22) Filed: Sep. 26, 2016

(65) Prior Publication Data

US 2017/0094533 A1    Mar. 30, 2017

Related U.S. Application Data

(60) Provisional application No. 62/232,470, filed on Sep. 25, 2015.

(51) Int. Cl.
| | |
|---|---|
| *H04W 16/32* | (2009.01) |
| *H04W 84/04* | (2009.01) |
| *H04W 88/08* | (2009.01) |
| *H04W 72/04* | (2009.01) |

(52) U.S. Cl.
CPC .......... *H04W 16/32* (2013.01); *H04W 72/042* (2013.01); *H04W 84/045* (2013.01); *H04W 88/08* (2013.01)

(58) Field of Classification Search
CPC ............... H04W 16/32; H04W 84/045; H04W 72/0446; H04W 16/24; H04W 72/042; H04W 72/0431; H04W 76/068; H04L 5/0053; H04L 5/007; H04L 1/1861; H04B 7/0626

USPC ........ 455/571, 574, 436; 370/336, 252, 328; 713/323
See application file for complete search history.

(56) References Cited

U.S. PATENT DOCUMENTS

| | | | |
|---|---|---|---|
| 2012/0281680 A1* | 11/2012 | Bostrom | H04L 5/0051 370/336 |
| 2015/0181523 A1* | 6/2015 | Koskinen | H04W 52/0251 370/311 |
| 2016/0278073 A1* | 9/2016 | Dinan | H04W 48/08 |

OTHER PUBLICATIONS

3GPP TS 36.321 V12.6.0 (Jun. 2015) Technical Specification 3rd Generation Partnership Project; Technical Specification Group Radio Access Network; Evolved Universal Terrestrial Radio Access (E-UTRA); Medium Access Control (MAC) protocol specification (Release 12).
3GPP TSG-RAN WG2 Meeting #91 R2-153964, Aug. 24-28, 2015.
3GPP TSG-RAN WG2 Meeting #91 R2-153963, Aug. 24-28, 2015.

* cited by examiner

*Primary Examiner* — Phuoc H Doan
(74) *Attorney, Agent, or Firm* — Winston Hsu

(57) ABSTRACT

A communication device for handling a deactivation timer comprises a storage unit for storing instructions and a processing circuit coupled to the storage unit. The processing circuit is configured to execute the instructions stored in the storage unit. The instructions comprise being configured a secondary cell (SCell) and a physical uplink (UL) control channel (PUCCH) of the SCell by a network; being configured to release the PUCCH of the SCell by the network; and starting a deactivation timer for the SCell after receiving a PDCCH from the network, when the PUCCH is released.

12 Claims, 5 Drawing Sheets

DEVICE AND METHOD OF HANDLING DEACTIVATING TIMER FOR SECONDARY CELL

CROSS REFERENCE TO RELATED APPLICATIONS

This application claims the benefit of U.S. Provisional Application No. 62/232,470 filed on Sep. 25, 2015, which is incorporated herein by reference.

BACKGROUND OF THE INVENTION

1. Field of the Invention

The present invention relates to a device and a method used in a wireless communication system, and more particularly, to a device and a method of handling a deactivating timer for a secondary cell.

2. Description of the Prior Art

A long-term evolution (LTE) system provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

The LTE system continues to be evolved to increase peak data rate and throughput by using advanced techniques, such as carrier aggregation (CA), dual connectivity (DC), licensed-assisted access, etc.

A network (e.g., eNB) may configure a deactivation timer for a secondary cell (SCell) to a UE. However, the UE disables the deactivation timer for the SCell configured with a physical uplink (UL) channel (PUCCH) according to the prior art. Accordingly, the network and the UE do not know how to handle the deactivation timer in certain situations, e.g., when a PUCCH configuration of the PUCCH is released and the SCell is still activated.

Thus, how to handle the deactivation timer for the SCell is an important problem to be solved.

SUMMARY OF THE INVENTION

The present invention therefore provides a communication device and method for handling a deactivating timer for a secondary cell.

A communication device for handling a deactivation timer comprises a storage unit for storing instructions and a processing circuit coupled to the storage unit. The processing circuit is configured to execute the instructions stored in the storage unit. The instructions comprise being configured a secondary cell (SCell) and a physical uplink (UL) control channel (PUCCH) of the SCell by a network; being configured to release the PUCCH of the SCell by the network; and starting a deactivation timer for the SCell after receiving a PDCCH from the network, when the PUCCH is released.

A base station for handling a deactivation timer comprises a storage unit for storing instructions and a processing circuit coupled to the storage unit. The processing circuit is configured to execute the instructions stored in the storage unit. The instructions comprise configuring a secondary cell (SCell) and a physical uplink (UL) control channel (PUCCH) of the SCell to a communication device; configuring the communication device to release the PUCCH of the SCell; transmitting a PDCCH of the SCell to the communication device, after configuring the communication device to release the PUCCH; and starting a deactivation timer for the SCell in response to transmitting the PDCCH to the communication device.

A base station for handling a deactivation timer comprises a storage unit for storing instructions and a processing circuit coupled to the storage unit. The processing circuit is configured to execute the instructions stored in the storage unit. The instructions comprise configuring a secondary cell (SCell), a value of a deactivation timer for the SCell and a physical uplink (UL) control channel (PUCCH) of the SCell to a communication device; configuring the communication device to release the PUCCH of the SCell; and transmitting an activation command which activates the SCell to the communication device, when configuring the communication device to the PUCCH.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
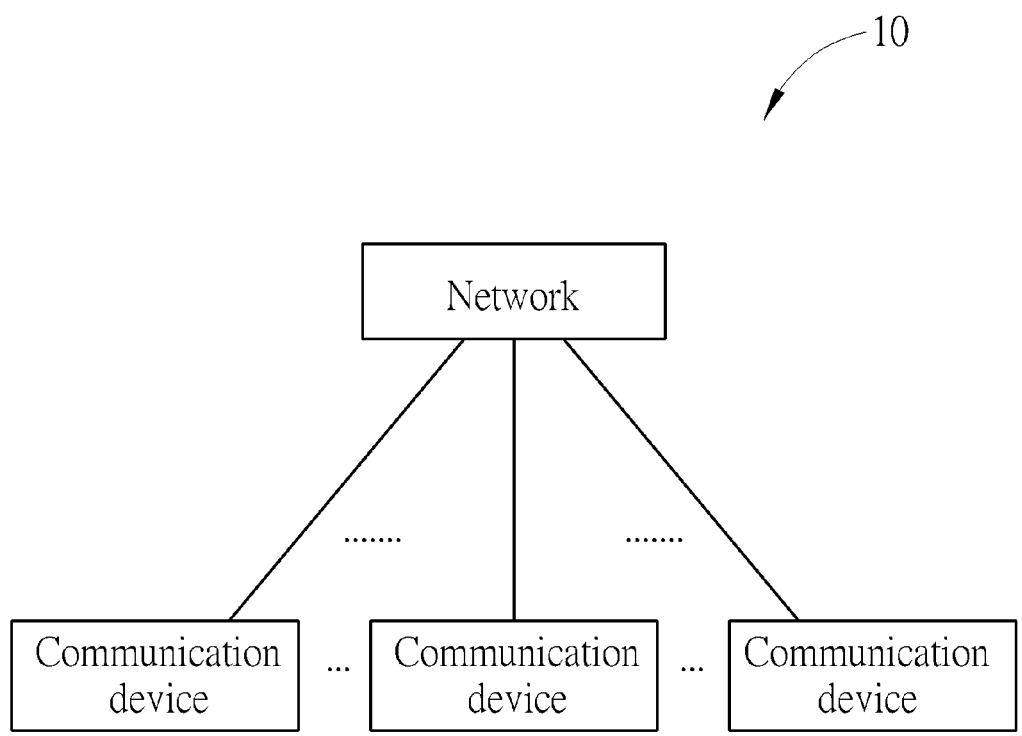
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may simultaneously communicate with each other via multiple cells (e.g., multiple carriers) including a primary cell (PCell) and one or more secondary cells (SCells). The abovementioned cells may be operated in the same or different frame structure types, or in the same or different duplexing modes, i.e. frequency-division duplexing (FDD) and time-division duplexing (TDD). For example, the PCell may be operated on a licensed carrier, while the SCell may be operated on an unlicensed carrier.

In FIG. 1, the network and the communication devices are simply utilized for illustrating the structure of the wireless communication system 10. Practically, the network may be a narrowband (NB) internet of things (IoT) network or an evolved universal terrestrial radio access network (E-UTRAN) including at least one evolved Node-B (eNB). The network may be a fifth generation (5G) network including at least one 5G base station (BS) which employs orthogonal frequency-division multiplexing (OFDM) and/or non-OFDM, and transmission time interval (TTI) shorter than 1 ms (e.g. 100 or 200 microseconds) for communication with the communication devices. In general, a base station (BS) may also be used to refer any of the eNB and the 5G BS.

A communication device may be a user equipment (UE), a machine type communication (MTC) device, a mobile phone, a laptop, a tablet computer, an electronic book, a portable computer system, a vehicle, an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
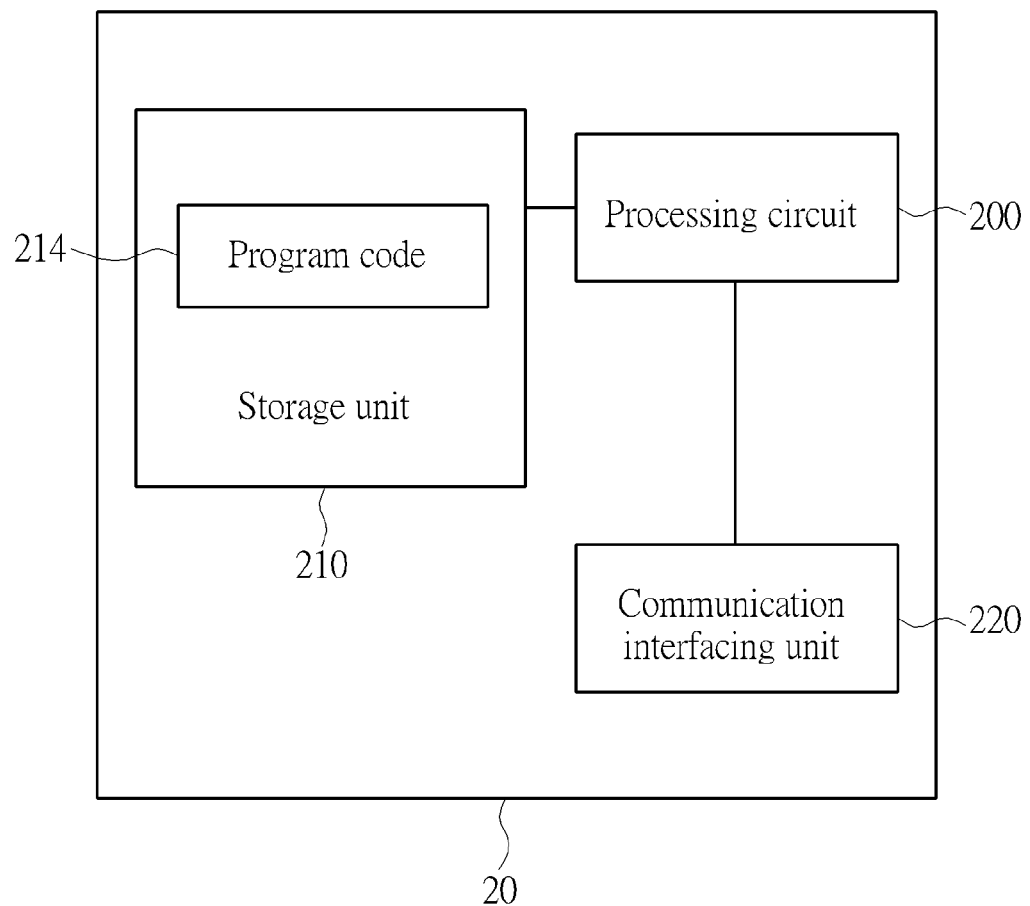
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage unit 210 and a communication interfacing unit 220. The storage unit 210 may be any data storage device that may store a program code 214, accessed and executed by the processing circuit 200. Examples of the storage unit 210 include but are not limited to a subscriber identity module (SIM), read-only memory (ROM), flash memory, random-access memory (RAM), hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing circuit 200.

In the following embodiments, a UE is used to represent a communication device in FIG. 1, to simplify the illustration of the embodiments.

Figure 3:
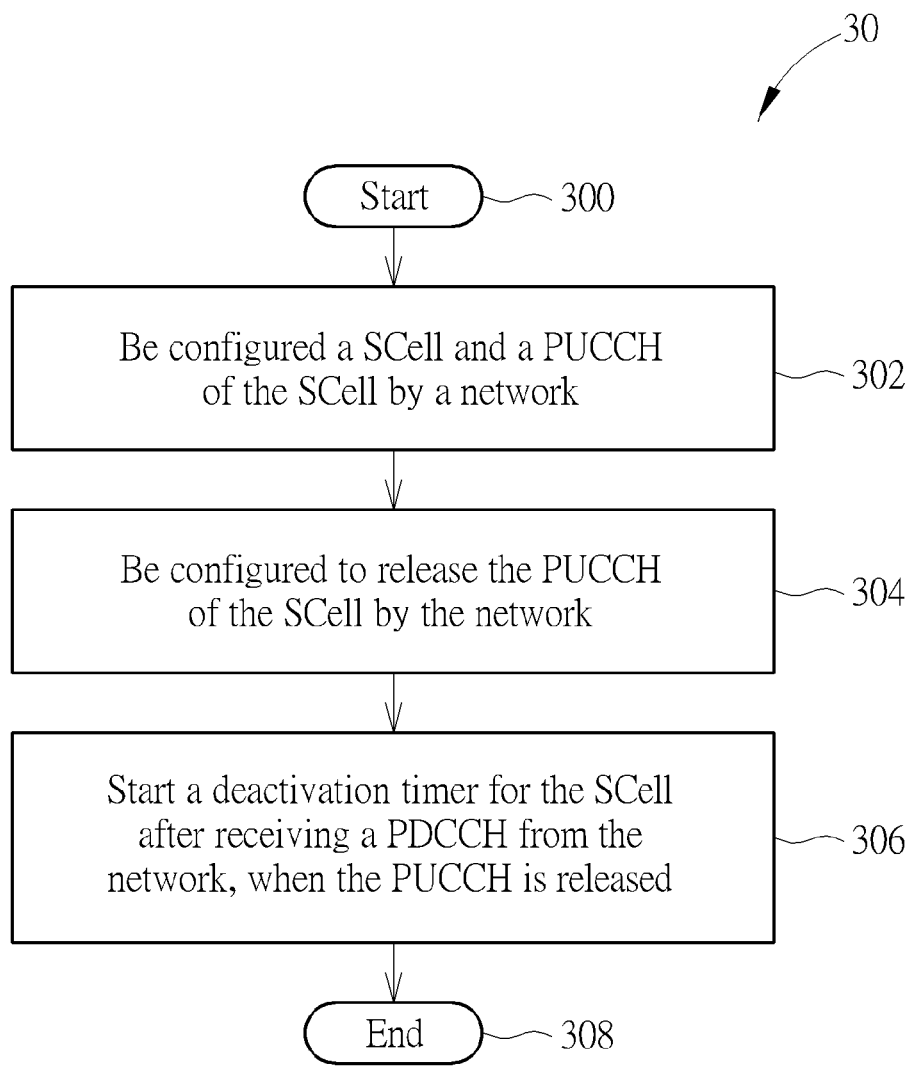
FIG. 3 is a flowchart of a process according to an example of the present invention.

FIG. 3 is a flowchart of a process 30 according to an example of the present invention. The process 30 may be utilized in a UE, for handling a deactivation timer for a SCell. The process 30 may be compiled into the program code 214 and includes the following steps:

Step 300: Start.
Step 302: Be configured a SCell and a physical UL control channel (PUCCH) of the SCell by a network.
Step 304: Be configured to release the PUCCH of the SCell by the network.
Step 306: Start a deactivation timer for the SCell after receiving a PDCCH from the network, when the PUCCH is released.
Step 308: End.

According to the process 30, the UE is configured a SCell and a PUCCH of the SCell by a network, and is configured to release the PUCCH of the SCell by the network. Then, the UE starts a deactivation timer (e.g., sCellDeactivationTimer) for the SCell after receiving a PDCCH from the network, when the PUCCH is released. That is, the UE starts the deactivation timer in response to receiving the PDCCH, when the PUCCH is released. When the deactivation timer expires and the PUCCH is released, the UE deactivates the SCell.

Realization of the process 30 is not limited to the above description. The following examples may be applied to the process 30.

In one example, the PDCCH is received on the SCell, and indicates a UL grant or a DL assignment. In one example, the PDCCH is received on a serving cell scheduling the SCell, and indicates a UL grant or a DL assignment for the SCell. In one example, the UE starts the deactivation timer according to a value of the deactivation timer. Further, the value of the deactivation timer is configured (e.g., determined) by the network.

An example is illustrated according to the process 30 as follows. An eNB transmits a first message (e.g., RRCConnectionReconfiguration) for configuring a PUCCH of a SCell to a UE. Then, the UE may receive an activation command which activates the SCell from the eNB. In response to the activation command, the UE may transmit hybrid automatic repeat request (HARQ) feedbacks (e.g., acknowledgements (ACKs) or negative acknowledgements (NACKs)) and/or channel quality indicators (CQIs) via the PUCCH. While the SCell is activated, the UE releases the PUCCH of the SCell, in response to receiving a second message (e.g., RRCConnectionReconfiguration) which releases a PUCCH configuration of the PUCCH from the network, or due to that a time alignment timer (TAT) expires but the SCell is still activated. Then, the UE starts a sCellDeactivationTimer for the SCell, when receiving a PDCCH/enhanced PDCCH (EPDCCH) on the SCell indicating a UL grant or a DL assignment, or when receiving a PDCCH/EPDCCH on a serving cell (e.g., PCell or another SCell) scheduling the activated SCell indicating a UL grant or a DL assignment for the SCell.

Correspondingly, when the eNB configures the UE to release the PUCCH, the eNB also considers that the UE starts the sCellDeactivationTimer for the SCell, after transmitting the PDCCH/EPDCCH. In one example, the eNB may start a corresponding sCellDeactivationTimer for the SCell in the eNB, after transmitting the PDCCH/EPDCCH. Thus, the UE and the eNB have the same understanding regarding the status of the sCellDeactivationTimer for the SCell. It should be noted that a value of the sCellDeactivationTimer may be configured to the UE (i.e., determined) by the eNB in the first message or in another message before the eNB configures the PUCCH of the SCell. Thus, the UE and the network operate regularly according to the deactivation timer. The problem that the UE and the network handle the deactivation timer differently is solved.

Figure 4:
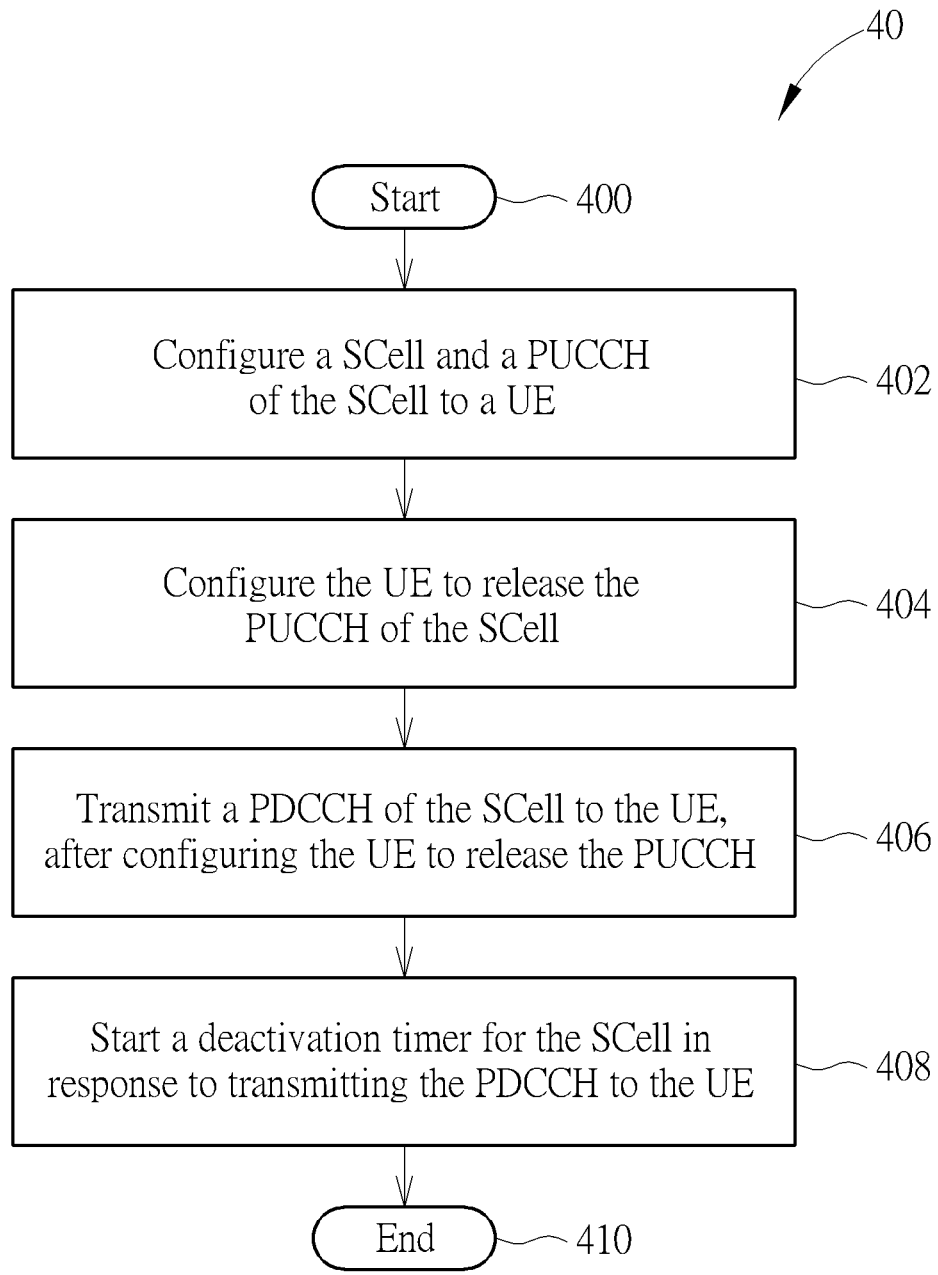
FIG. 4 is a flowchart of a process according to an example of the present invention.

Operations of the eNB in the above examples can be summarized into a flowchart of a process 40 shown in FIG. 4, which includes the following steps:

Step 400: Start.
Step 402: Configure a SCell and a PUCCH of the SCell to a UE.
Step 404: Configure the UE to release the PUCCH of the SCell.
Step 406: Transmit a PDCCH of the SCell to the UE, after configuring the UE to release the PUCCH.
Step 408: Start a deactivation timer for the SCell in response to transmitting the PDCCH to the UE.
Step 410: End.

Detailed operations and variations of the process 40 can be referred to the above illustration, and are not narrated herein.

Figure 5:
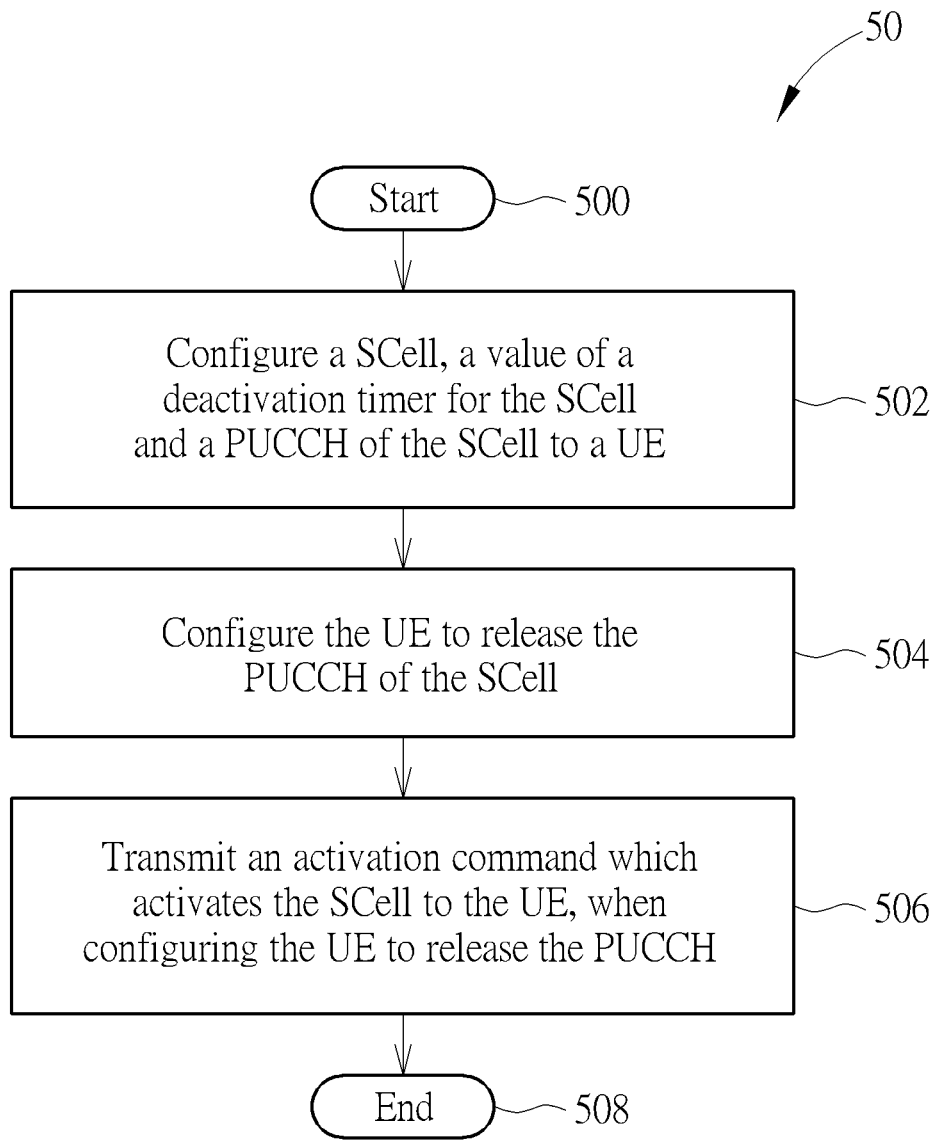
FIG. 5 is a flowchart of a process according to an example of the present invention.

FIG. 5 is a flowchart of a process 50 according to an example of the present invention. The process 50 may be utilized in the network (e.g., eNB), for handling a deactivation timer for a SCell. The process 50 may be compiled into the program code 214 and includes the following steps:

Step 500: Start.
Step 502: Configure a SCell, a value of a deactivation timer for the SCell and a PUCCH of the SCell to a UE.
Step 504: Configure the UE to release the PUCCH of the SCell.

Step 506: Transmit an activation command which activates the SCell to the UE, when configuring the UE to release the PUCCH.

Step 508: End.

According to the process 50, the network configures a SCell, a value of a deactivation timer (e.g., sCellDeactivationTimer) for the SCell and a PUCCH of the SCell to a UE. After a while, the network configures the UE to release the PUCCH of the SCell, e.g. due to its radio resource management. Then, the network transmits an activation command which activates the SCell to the UE, when configuring the UE to release the PUCCH. That is, the activation command is transmitted to the UE such that the UE starts the deactivation timer in response to the activation command.

Realization of the process 50 is not limited to the above description. The following examples may be applied to the above processes.

In one example, the network transmits a deactivation command to the UE for deactivating the SCell, before transmitting the activation command after releasing the PUCCH.

An example is illustrated according to the above processes as follows. An eNB transmits a first message (e.g., RRCConnectionReconfiguration) to configure a PUCCH of a SCell to a UE. Then, the UE may receive a first activation command which activates the SCell from the eNB. The UE may transmit HARQ feedbacks (e.g., ACKs or NACKs) and/or CQIs via the PUCCH in response to the first activation command. While the SCell is activated, the UE releases the PUCCH of the SCell, when receiving a second message (e.g., RRCConnectionReconfiguration) which releases a PUCCH configuration of the PUCCH from the eNB, or due to that a TAT expires. Then, the eNB may transmit a second activation command which activates the SCell to the UE for the UE to start the sCellDeactivationTimer when the PUCCH is released. The UE starts the sCellDeactivationTimer for the SCell, when the UE receives the second activation command.

Correspondingly, the eNB also considers that the UE starts the sCellDeactivationTimer for the SCell, when transmitting the second activation command. In one example, the eNB may start a corresponding sCellDeactivationTimer for the SCell in the eNB, in response to transmitting the second activation command. Thus, the UE and eNB have the same understanding regarding the status of the sCellDeactivationTimer for the SCell. It should be noted that a value of the sCellDeactivationTimer may be configured to the UE by the eNB in the first message, the second message or another message.

While the PUCCH is configured for the SCell, the sCellDeactivationTimer for the SCell does not take effect. In one example, the UE may not start the sCellDeactivationTimer for the SCell, when receiving the first activation command. In another example, the UE may start the sCellDeactivationTimer for the SCell but does not deactivate the SCell, when the sCellDeactivationTimer expires. The eNB considers that the sCellDeactivationTimer for the SCell does not take effect at the UE. In one example, the eNB may not start the corresponding sCellDeactivationTimer for the SCell in response to transmitting the first activation command. In another example, the eNB may start the corresponding sCellDeactivationTimer for the SCell, but the eNB considers that the UE does not deactivate the SCell when the corresponding sCellDeactivationTimer expires. In addition, if the UE does not receive any activation command, the UE does not start the sCellDeactivationTimer when receiving a PDCCH/EPDCCH on the SCell indicating a UL grant or a DL assignment or when receiving a PDCCH/EPDCCH on a serving cell (e.g., PCell or another SCell) scheduling the SCell indicating a UL grant or a DL assignment for the SCell. Correspondingly, the eNB does not consider that the UE starts the sCellDeactivationTimer, when the eNB transmits the PDCCH/EPDCCH without transmitting the activation command.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the processes above may be compiled into the program code 214.

To sum up, the present invention provides a communication device and method of handling a deactivating timer for a secondary cell. The communication device and a network can operate regularly due to the same understanding of the status of the deactivation timer. The problem that the UE and the network handle the deactivation timer differently is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a deactivation timer, comprising:
   a storage unit, for storing instructions of:
     being configured a secondary cell (SCell) and a physical uplink (UL) control channel (PUCCH) of the SCell by a network;
     being configured to release the PUCCH of the SCell by the network; and
     starting a deactivation timer for the SCell after receiving a PDCCH from the network, when the PUCCH is released; and
   a processing circuit, coupled to the storage unit, configured to execute the instructions stored in the storage unit.

2. The communication device of claim 1, wherein the PDCCH is received on the SCell, and indicates a UL grant or a downlink (DL) assignment.

3. The communication device of claim 1, wherein the PDCCH is received on a serving cell scheduling the SCell, and indicates a UL grant or a DL assignment for the SCell.

4. The communication device of claim 1, wherein the communication device starts the deactivation timer according to a value of the deactivation timer.

5. The communication device of claim 4, wherein the value of the deactivation timer is configured by the network.

6. A base station for handling a deactivation timer, comprising:
   a storage unit, for storing instructions of:
     configuring a secondary cell (SCell) and a physical uplink (UL) control channel (PUCCH) of the SCell to a communication device;
     configuring the communication device to release the PUCCH of the SCell;

transmitting a PDCCH of the SCell to the communication device, after configuring the communication device to release the PUCCH; and starting a deactivation timer for the SCell in response to transmitting the PDCCH to the communication device; and a processing circuit, coupled to the storage unit, configured to execute the instructions stored in the storage unit.

7. The communication device of claim 6, wherein the PDCCH is transmitted on the SCell, and indicates a UL grant or a downlink (DL) assignment.

8. The communication device of claim 6, wherein the PDCCH is transmitted on a serving cell scheduling the SCell, and indicates a UL grant or a DL assignment for the SCell.

9. The communication device of claim 6, wherein the base station starts the deactivation timer according to a value of the deactivation timer.

10. The communication device of claim 9, wherein a value of the deactivation timer is determined by the base station.

11. A base station for handling a deactivation timer, comprising:

a storage unit, for storing instructions of:

configuring a secondary cell (SCell), a value of a deactivation timer for the SCell and a physical uplink (UL) control channel (PUCCH) of the SCell to a communication device;

configuring the communication device to release the PUCCH of the SCell; and transmitting an activation command which activates the SCell to the communication device, when configuring the communication device to release the PUCCH; and a processing circuit, coupled to the storage unit, configured to execute the instructions stored in the storage unit.

12. The communication device of claim 11, wherein the storage unit further stores an instruction of:

transmitting a deactivation command to the communication device for deactivating the SCell, before transmitting the activation command after releasing the PUCCH.

* * * * *